United States Patent [19]
Crossland et al.

[11] Patent Number: 5,309,299
[45] Date of Patent: May 3, 1994

[54] METHOD AND SYSTEM FOR POSITION ERROR SIGNAL GENERATION USING AUTO CORRELATION

[75] Inventors: James F. Crossland; Don G. East; John A. Koski; James E. Smith, all of Tucson, Ariz.

[73] Assignee: International Business Machines Corporation, Armonk, N.Y.

[21] Appl. No.: 958,151

[22] Filed: Oct. 7, 1992

[51] Int. Cl.$^5$ ................................................. G11B 5/58
[52] U.S. Cl. ............................. 360/77.01; 360/77.07; 360/77.12
[58] Field of Search ............... 360/77.02, 77.07, 77.14, 360/77.12, 77.11, 77.01

[56] References Cited

U.S. PATENT DOCUMENTS

| | | | |
|---|---|---|---|
| 4,122,432 | 10/1978 | Triebold et al. | 340/15 |
| 4,185,172 | 1/1980 | Melindo et al. | 179/15 BY |
| 4,519,007 | 5/1985 | Sellars | 360/77.01 |
| 4,616,333 | 10/1986 | Shimoni | 364/819 |
| 4,791,599 | 12/1988 | Hethuin et al. | 364/728.07 |
| 4,860,239 | 8/1989 | Baron | 364/728.03 |
| 4,933,786 | 6/1990 | Wilson | 360/78.14 |

FOREIGN PATENT DOCUMENTS

0420439A1 4/1991 European Pat. Off. .

OTHER PUBLICATIONS

IBM Technical Disc. Bulletin vol. 21 No. 3, Aug. 1978, C. H. Kalthoff et al. "Servo Angle And Tape Measurement Fixture" pp. 915–916.

IBM Technical Disc. Bulletin vol. 20 No. 9, Feb. 1978, D. R. McEfee "Read/Write Servo Magnetic Head" 3673–3674.

IBM Technical Disc. Bulletin vol. 31 No. 11, Apr. 1989, M. R. Cannon "Tape Guard Band Reduction For High Track Density Storage" p. 219.

IBM Technical Disc. Bulletin vol. 19 No. 3, Aug. 1976, J. Lewkowicz et al. "Tri-Bit Servo Detection" pp. 810–813.

IBM Technical Disc. Bulletin vol. 25 No. 2, Jul. 1982, T. A. Schwarz "Re-Recordable Servo System For Multi-Track Tape" pp. 778–779.

IBM Technical Disc. Bulletin vol. 23 No. 2, Jul. 1980, E. G. Gruss et al. "Servo System For Magnetic Recording Based On Time Comparison" pp. 787–789.

Research Disclosure Aug. 1991, No. 328, Kenneth Mason Publications Ltd, England "Combined Data/Servo Track Magnetoresistive Sensor For Magnetic Tape Heads" disclosed anonymously.

*Primary Examiner*—Aristotelis Psitos
*Assistant Examiner*—James T. Wilson
*Attorney, Agent, or Firm*—Duke W. Yee; Andrew J. Dillon

[57] ABSTRACT

The present invention provides a method and system for generating a position error signal from a signal produced by a read element detecting a track comprising two harmonically unrelated patterns positioned parallel to each other on a magnetic media. The apparatus of the present invention produces a delayed signal from the read signal produced by the read element. The read signal is multiplied with the delayed signal to form a product signal. The product signal is integrated to produce a position error signal, wherein changes in the position error signal that are proportional to changes in position of the read element over the two patterns positioned parallel to each other on the magnetic media.

37 Claims, 11 Drawing Sheets

METHOD AND SYSTEM FOR POSITION ERROR SIGNAL GENERATION USING AUTO CORRELATION

BACKGROUND OF THE INVENTION

1. Technical Field

The present invention relates in general to a magnetic media storage system and in particular, to a magnetic tape storage system utilizing a servo system to position a read/write head over parallel data tracks. Still more particularly, the present invention relates to a method and system for generating a position error signal for use in parallel track tape storage systems utilizing servo systems to dynamically position a read/write head over parallel data tracks.

2. Description of the Related Art

In high track density magnetic storage systems, manufacturing tolerances, tape interchange, and thermal and hygroscopic variations all cause track misalignment of a multitrack tape format. Track densities on magnetic tape are limited by the maximum possible track misalignment between the magnetic tracks on the tape and the transducer tracks in the read/write head. Reducing the misalignment of the read/write head by using a servo system to guide the read/write head relative to the magnetic tracks allows the track width and guardbands to be decreased, thereby increasing recording densities and resulting in better product performance.

Misalignment may be partially overcome utilizing an indexing mechanism that performs initial alignment, but does nothing to correct dynamic misalignments. A solution for dynamically correcting read/write head position involves continuously sensing head-to-track position as required for closed loop track following.

The current and prior art for obtaining servo information from magnetic recording media fall into three categories, which may be used singly or in concert to correct misalignment between the data tracks and the transducer elements:

(a) Isolated bursts of positioning information are strategically placed in the format of the storage medium to allow correction of manufacturing tolerances and machine-to-machine variations (e.g., as taught in IBM Technical Disclosure Bulletin, Vol. 31, No. 11, 04-89, p.219, by Cannon).

(b) Periodic samples of positioning information may be regularly interspersed with the recorded data (e.g., as cited in Research Disclosure n.328, 08-91), with the positioning information consisting of any of several well known recorded patterns, such as single frequency bursts alternately displaced to either side of the desired position, or multiple frequencies recorded on adjacent tracks. Within the limitations imposed by the sampling process, periodic and quasi-periodic alignment variations may be sensed and compensating corrections made.

(c) Continuous tracks of positioning information may be provided on the recording medium. This information may be physically inscribed, included as a magnetic sub-layer (both described in IBM Technical Disclosure Bulletin, Vol. 23, No. 2, 07-80, pp.787-789, by Gruss & Tietze), magnetically recorded in a formatting process a priori use for data storage (e.g., IBM Technical Disclosure Bulletin, Vol. 19, No. 3, 08-76, pp.810-813, by Lewkowiez & Stephens), or recorded concurrently with the recording of data (e.g., IBM Technical Disclosure Bulletin, Vol. 25, No. 2, 07/82, pp.778-779, by T. A. Schwarz). Continuity of the position information permits detection and correction of transient (non-periodic, non-repeatable) misregistration conditions.

The positioning information is recorded in physically (or logically) adjacent regions on the medium, and typically consists of magnetic patterns differing in frequency, phase, encoded data, physical or time position. A Position Error Signal is derived by detecting changes in amplitude or phase from nominal; thus, noise occurring as amplitude perturbations or as timing jitter corrupts the detected positioning information. Satisfactory performance of the servo systems in each category depends on complicated and expensive servo writing systems.

It would be desirable to have an improved method and system, in a high track density tape storage system utilizing a continuous track following servo head positioner, for generating a position error signal to correct head/track misregistration requiring no precision servo writer while minimizing noise induced errors.

SUMMARY OF THE INVENTION

It is therefore one object of the present invention to provide a method and system for detecting the position error between a read transducer and pre-recorded servo tracks.

It is another objective of the present invention to provide a method and system for detecting the position error in parallel track storage systems utilizing servo systems to position a read/write head over the data tracks.

It is yet another objective of the present invention to provide a method and system for generating a position error signal for positioning a read/write head, controlled by a servo system, over data tracks in a parallel track storage system.

The foregoing objects are achieved as is now described. The present invention provides a method and system for generating a position error signal from a read signal produced by a read element. The read signal is generated in response to detecting a track with two patterns positioned parallel and logically or physically adjacent to each other on a magnetic medium. Changes in the position error signal are proportional to changes in position of the read element over the two patterns on the magnetic media. The magnetic media may be of various forms, including a magnetic tape utilized in tape drive systems, and fixed or removable magnetic disks.

The system of the present invention produces a trinary approximation of the read signal produced by the read element. The trinary approximation is temporarily stored for a predefined interval, then used to selectively switch true and complement forms of the read signal thus forming a product signal. Next, the product signal is integrated to produce a position error signal, when certain conditions are satisfied.

The Storage Delay, $T_{delay}$, may be selected as follows:

$$\frac{f_1}{f_2} = \frac{n}{m + \frac{1}{2}}, \quad T_{delay} = nT_1 = \left[m + \frac{1}{2}\right]T_2$$

or $$\frac{f_1}{f_2} = \frac{m + \frac{1}{2}}{n}, \quad T_{delay} = \left[m + \frac{1}{2}\right]T_1 = nT_2$$

where m and n are selected positive integers, $f_1$ is frequency of the first pattern on the magnetic media, $f_2$ is the frequency of the second pattern on the magnetic media, $T_1 1/f_1$, $T_2 = 1/f_2$, and $T_{delay}$ is the storage interval. The two patterns are required to be harmonically unrelated to each other.

The temporary storage in the present invention may be a random access memory, wherein the trinary signal is stored in the memory for a period of time set by the delay before the signal is retrieved to produce the delayed signal. The analog read signal may be converted to trinary digital form by simple comparators for storage in the memory. An analog to digital (A/D) convertor may be utilized to convert the analog signal into a digital signal for storage in the memory.

The present invention also may have an address generation circuit such as a counter to provide addresses to direct storage, delay, and retrieval of the digital signal from the memory. A selection circuit may be utilized to select the addresses generated, thereby selecting the delay in the digitized read signal, and enabling alternate choices for the integers m and n.

Two delays also may be utilized in accordance with a preferred embodiment of the present invention. In a dual delay system, another address generation circuit, such as an adder, may be employed with the counter to provide a second set of addresses to produce a second delay. The two delayed signals, produced by the two delays, separately switch true and complement forms of the read signal to produce two product signals. These two product signals are subtracted from each other, resulting in a differential signal that is then integrated and averaged by the integration circuitry to produce a position error signal. The order of subtraction is not important in accordance with a preferred embodiment of the present invention. Alternatively, the two product signals each may be integrated and then the two integrated signals are subtracted from each other to produce a position error signal.

The integration and averaging functions may be implemented with a low-pass filter, such as a second order low-pass filter. An automatic gain control circuit may be added to normalize the read signal from the read element, producing a normalized read signal for use by the rest of the system. Additionally, a filter may be interposed between the read element and the automatic gain control circuit to prevent saturation effects in high noise situations.

When a read element in the tape head is at the center of the servo track, equal portions of both patterns are detected by the read element and are translated into a read signal. In this situation, the resulting position error signal will be zero. If the read element drifts away from the center of the track, the proportion of the patterns translated into a read signal will not be equal. Autocorrelation of the signal will result in a positive or negative position error signal, depending on which direction the read element drifts from the servo track.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Autocorrelation is utilized in a preferred embodiment of the present invention to provide a position error signal. Generally, autocorrelation is a continuous process that is applied to time-varying data to extract potential cause-and-effect relationships between time-displaced observations.

The autocorrelation function describes the general dependence of the values of data at one time on the values of data at another time. The evaluation of the time average of the integrated product of a time series with itself delayed, by some interval, $\tau$, will reach a maximum for a delay period equal to an integral multiple of periods of repetitive structures within the time series. Conversely, if the period of one or more repetitive signals suspected to be present within a time series is known, the magnitudes of these signals may be computed by examining the ratio of the autocorrelation functions for the signals evaluated at the various corresponding delay intervals. This computation assumes that the differing signals are not related harmonically.

Consider a time series represented by X(t), and let:

$$X(t) = y_\sigma f(t) + y_N N(t)$$

where f(t) is a repetitive periodic function with the DC component, $\mu$, equal to zero, and unit amplitude; N(t) is a random noise function of time, having a distribution, say, uniform $[-1,1]$. The coefficients $y_\sigma$ and $y_N$ describe the relative amplitudes and always sum to unity.

The autocorrelation function for X(t) may be written as:

$$R_x(\tau) = \lim_{T \to \infty} \frac{1}{T} \int_0^T X(t)X(t + \tau)dt$$

An estimate of $R(\tau)$ may be obtained by averaging over the observation interval T. The resulting average will approach the exact function as the observation interval becomes large ($T \to \infty$).

The principal application of the autocorrelation function is in the analysis of the relationship of values of a times series in one time frame to the values in another time frame. The time separation or delay of the two intervals is represented by $\tau$ or $T_{delay}$. Since a repetitive deterministic function will have an autocorrelation function that persists for all values of $\tau$, as opposed to nondeterministic functions with autocorrelations that fall rapidly toward zero with increasing $\tau$, autocorrelation provides a tool for detecting periodic functions with extremely low signal-to-noise ratios.

Figure 1:
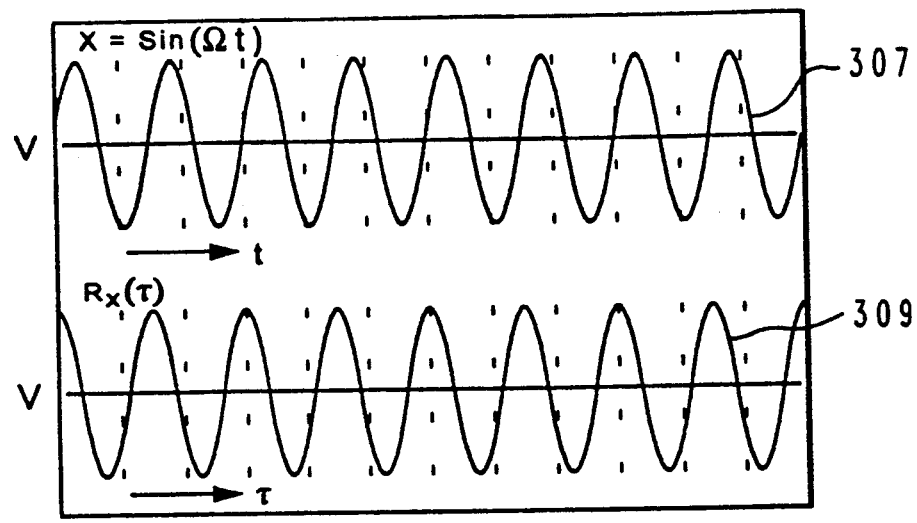
FIG. 1 is a graph of a sine function and an autocorrelation of the sine function.

Now, consider the case where f(t) is $\sin(\Omega t)$ as illustrated by signal 307 in FIG. 1. Signal resulting from the autocorrelation of $\sin(\Omega t)$, swings from $-0.5$ to $0.5$. Signal 309 reaches extremes at the points where $\tau$ is a multiple of half intervals and crosses zero at the quadrature points. In this particular case, the integral becomes:

$$R(\tau) = \frac{1}{T} \int \sin^2(\Omega t) dt$$

$$R(2n\pi) = \frac{1}{T}\left(\frac{1}{2}T - \frac{1}{4}\sin 2T\right)$$

and the maximum at $T = 2n\pi$ is $0.5$

Likewise, consider $X(t) = r\cos(\Omega_1 t + \delta)$; $Y(t) = a\cos(\Omega_2 t + \sigma)$. Then, $$R_{xx}(\tau) = \frac{r^2}{2}\cos(\Omega_1 \tau)$$

and

-continued $$R_{xy}(\tau) = \frac{1}{2} ra\cos(\Omega_1 \tau + \delta + \sigma), \text{ iff } \Omega_1 = \Omega_2 = 0, \text{ otherwise}$$

so that R(max) = 0.5.

Figure 2:
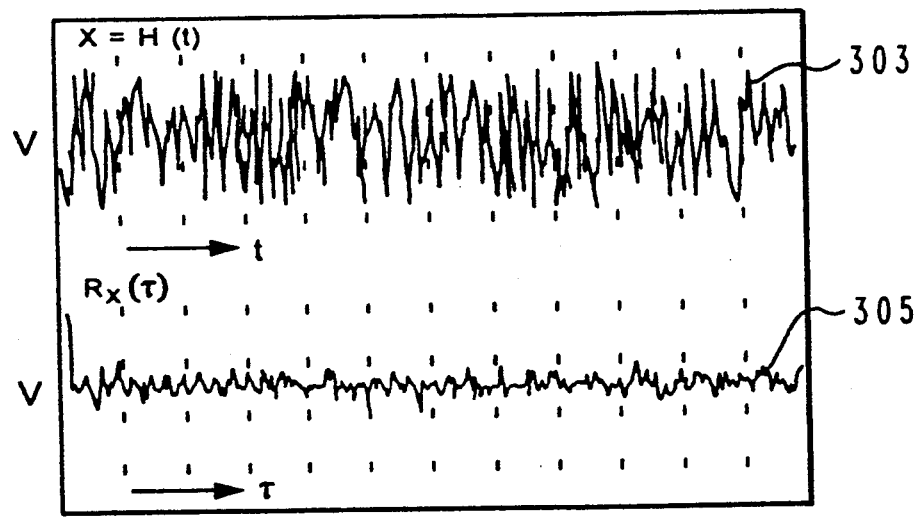
FIG. 2 depicts a graph of a random signal and an of the random signal.

Referring now to FIG. 2, a graph of random signal 303 and autocorrelogram 305, which is the autocorrelation of random signal 303, is illustrated. After an initial maximum at $\tau = 0$ (all functions correlate with a zero time difference), signal 305 decreases to nearly zero. In FIG. 2, the noise being considered is random in magnitude, uniformly distributed from $-1$ to $1$.

Figure 3:
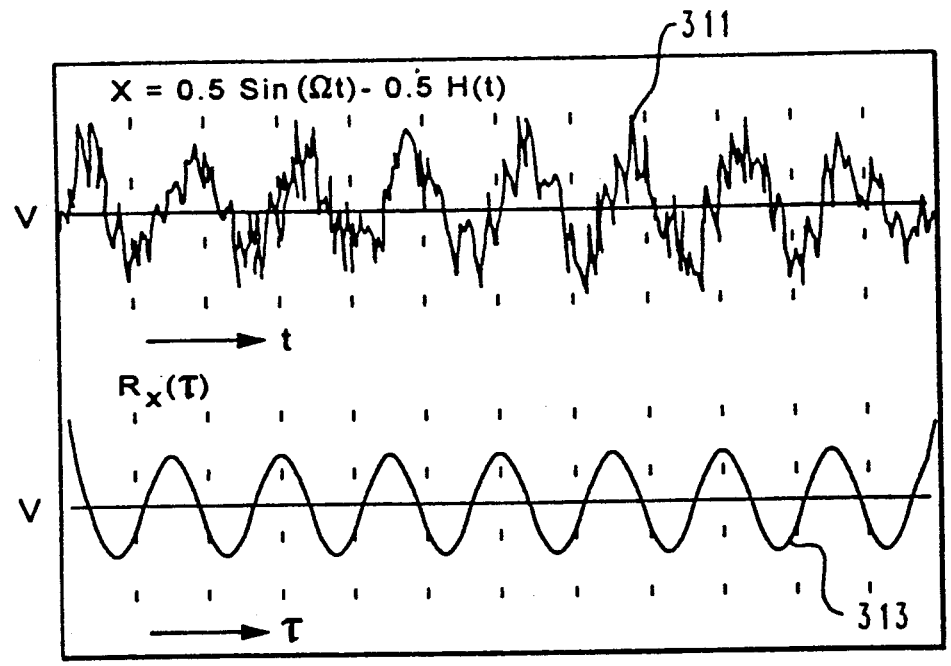
FIG. 3 is a graph of a sine wave with additive noise signal resulting from the autocorrelation of the sine wave with additive noise.

Next, FIG. 3 depicts a graph of a sine wave with additive noise and a signal resulting from the autocorrelation of the sine wave. The sine wave with additive noise is depicted by signal 311, while the autocorrelation of signal 311 is shown by signal 313. The autocorrelation of the sine wave with additive noise, results in a signal that is itself sinusoidal with a period equal to that of the input sine wave.

This function is useful for detecting repetitive signals within random fluctuations, such as noise. For example, in the case of the detection of position error signals for a closed-loop servo system, the period and the shape of the desired signal are known a priori. As a result, autocorrelation base methods may be implemented in accordance with a preferred embodiment of the present invention to produce a position error signal, wherein patterns requiring a deterministic phase relationship between each other are unnecessary.

Figure 4:
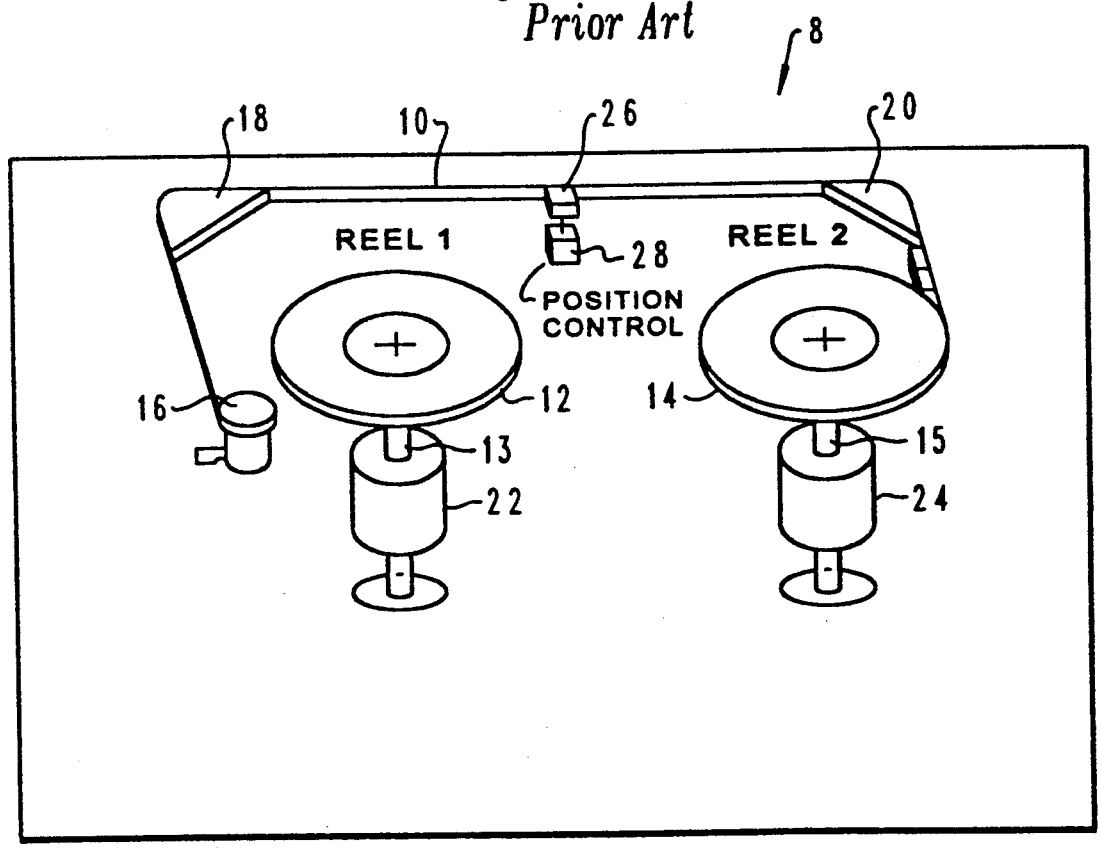
FIG. 4 depicts a diagram of components in a parallel track magnetic tape storage system in which a preferred embodiment of the present invention may be implemented.

FIG. 4 depicts a diagram of components in a parallel track magnetic tape storage system in which a preferred embodiment of the present invention may be implemented. Tape storage system 8 includes tape 10 which is moved between reel 12 and reel 14 along tape guides 16, 18, and 20. Reel 12 is mounted on spindle 13, and reel 14 is mounted on spindle 15. Reel 12 and reel 14 are driven by motor 22 and motor 24 turning spindles 13 and 15. Read/Write and servo head 26 is positioned over tape 10 by head position actuator 28. Read/write and servo head 26 may be positioned utilizing signals generated by a position error signal generation circuit in accordance with a preferred embodiment of the present invention. The position error signal generation circuit may be contained within head position actuator 28 in accordance with a preferred embodiment of the present invention.

Figure 5:
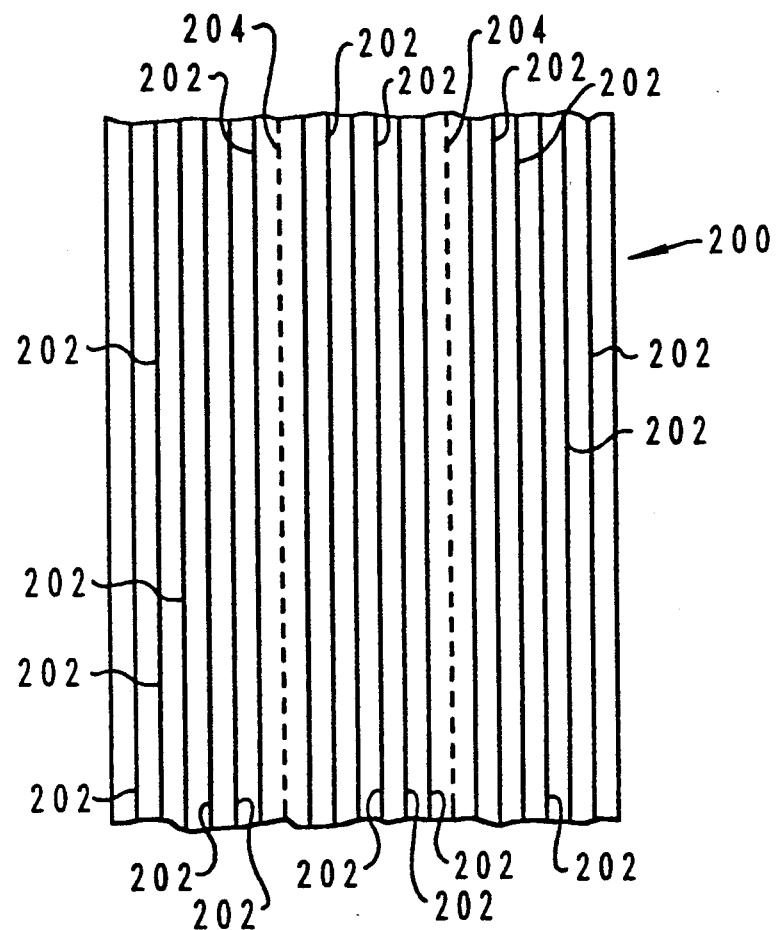
FIG. 5 depicts a magnetic tape with data tracks and servo tracks.

The method and system of the present invention may be used with tape storage unit 8 having a head positioning servo system according to a variety of well-known mechanisms. A position error signal for such system represents the physical positioning of the head with respect to a servo track on the tape. FIG. 5 illustrates a magnetic tape 200 with data tracks 202 and servo tracks 204. As may be seen in FIGS. 6A, 6B and 6C, read element 212 within a read head is positioned over various regions of servo track 216. Optimally, read element 212 is over division 217 as illustrated in FIG. 6A in servo track 216.

Servo track 216 is, in fact, comprised of two patterns of somewhat different periods, in section 218 and section 220, recorded side by side on magnetic tape 200 and read concurrently by read element 212 to produce a signal including some combination of both patterns. The pattern in section 218 has one frequency, $f_1$, while pattern in section 220 has a second frequency, $f_2$. Although intended to be constant in frequency, these frequencies are shifted as functions of non-uniform tape speed.

In accordance with a preferred embodiment of the present invention, two patterns or signals, each with a different frequency, are located side by side on a magnetic tape for a servo track. These two patterns are not related harmonically and are repetitive. The boundary between the two patterns is the position where the read element is correctly aligned along the servo track in accordance with a preferred embodiment of the present invention although other positions may be chosen by redefinition of "correct alignment".

Figure 6B:
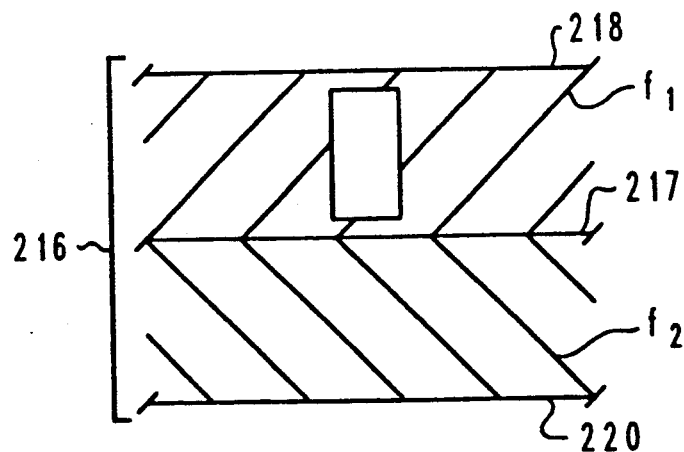
FIG. 6B shows a read element over a servo track.
Figure 6A:
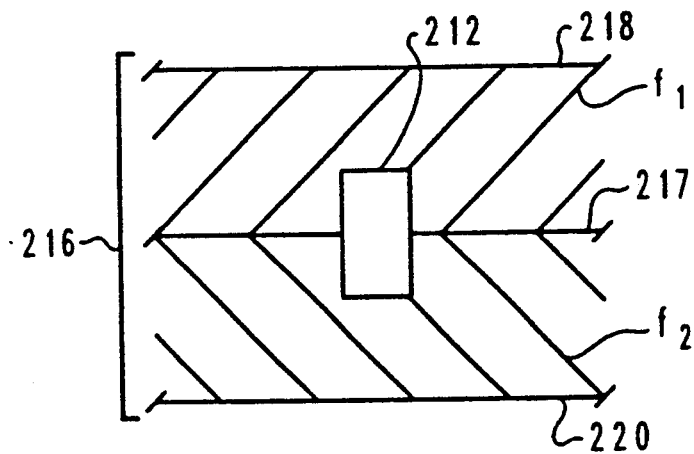
FIG. 6A shows a read element over a servo track.

While the read element is aligned, as shown in FIG. 6A, the result of both patterns being processed using autocorrelation results in a position error signal of zero. In such a situation equal amounts of each pattern are present in the signal generated by the read element in accordance with a preferred embodiment of the present invention.

Figure 6C:
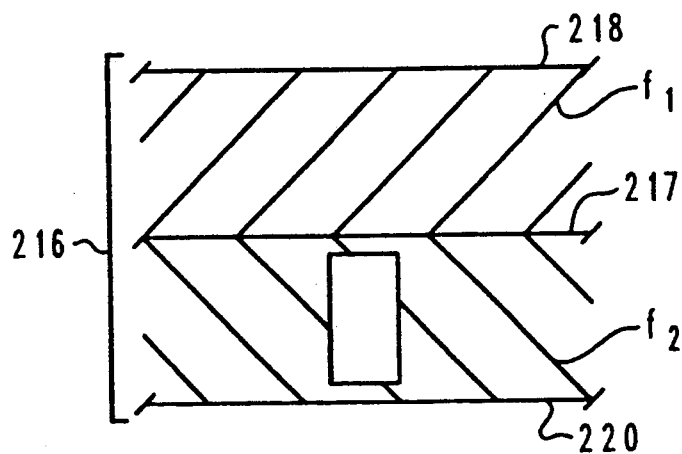
FIG. 6C shows a read element over a servo track.

When the read element is positioned away from the line or gap in the servo track to an extreme position, as illustrated in FIGS. 6B and 6C, the position error signal is plus or minus some voltage V, depending on which way the read element has drifted in relation to the center of the servo track. If the read element drifts to positions between the two extremes illustrated in FIGS. 6B and 6C, the position error signal generated is a voltage between plus or minus V. The position error signal changes in proportion to the drift of the read element over the servo track. The position error signal is proportional to the distance that the read element drifts from the center of the servo track. As a result, these values may be utilized to produce a position error signal to dynamically correct tape head alignment.

Figure 7:
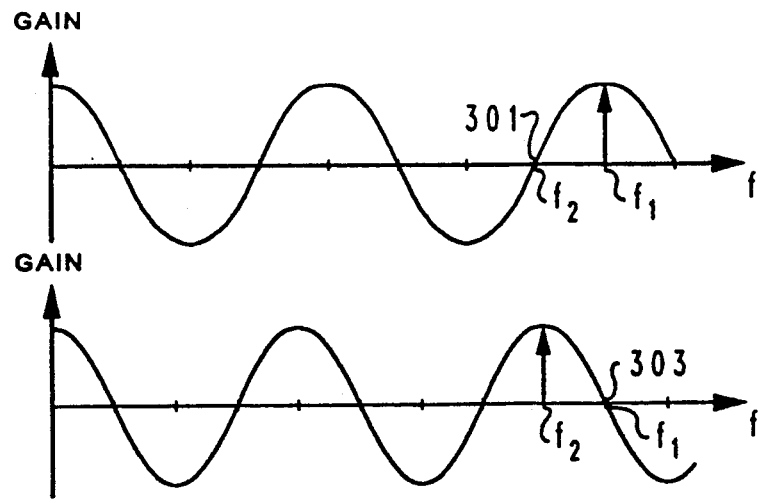
FIG. 7 depicts transfer functions of two autocorrelators different delays.

The frequencies of the two signals, $f_1$ and $f_2$, and the autocorrelation delay may be chosen such that the autocorrelation of $f_1$ is at a maximum, while the autocorrelation $f_2$ is at a null 301 as shown in FIG. 7. Conversely, another autocorrelation delay may be chosen such that the autocorrelation of $f_2$ is at a maximum while the autocorrelation of $f_1$ is at a null 303.

As mentioned before, a trinary representation of the read signal is delayed to produce one or two delayed signals. In turn, the delayed signal or signals are "multiplied" by the read signal to produce a product signal or signals, wherein "multiplication" is taken to mean true/-complement switching as will be explained later.

Figure 8A:
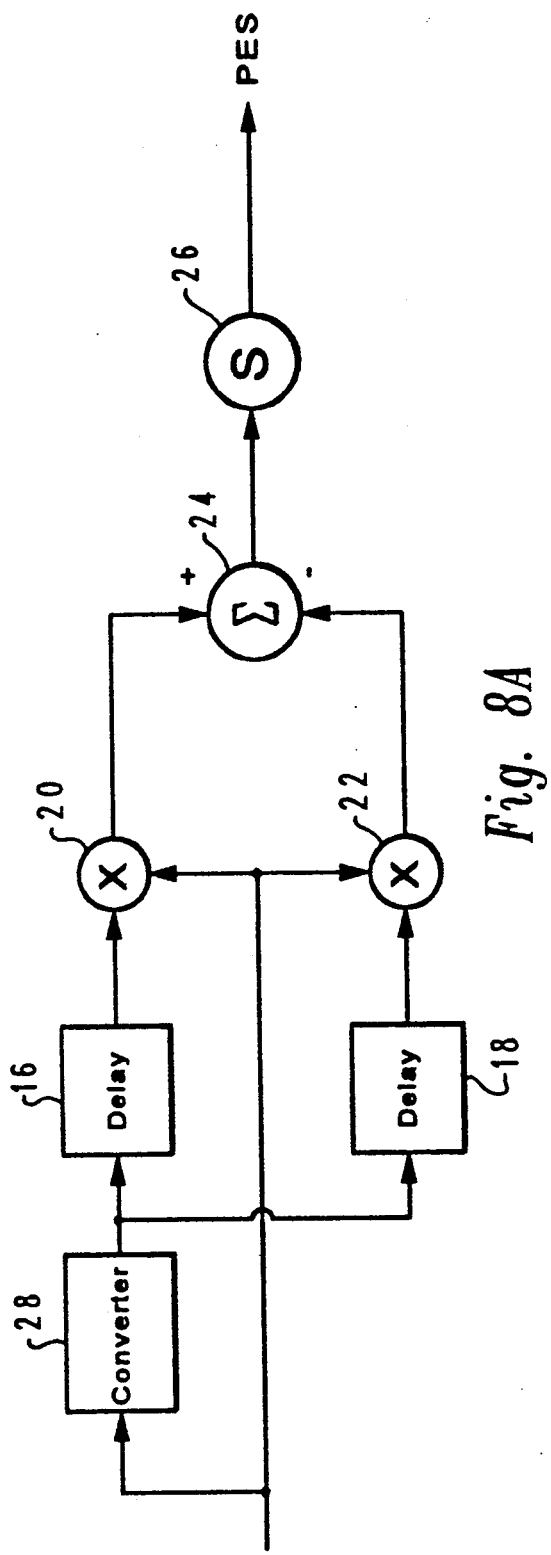
FIG. 8A is a simple block diagram of a position error signal generation circuit using a dual delay in accordance with a preferred embodiment of the present invention.

In the case of a dual delay position error generator as illustrated in FIG. 8A, the read signal is converted to trinary by block 28 and sent into delay blocks 16 and 18 to produce two delayed signals. Delay block 16 Causes a different delay from delay block 18. Each of the delayed signals is separately "multiplied" by the read signal at blocks 20 and 22 to form two product signals. Afterward, one of the product signals is subtracted from the other product signal to generate a subtraction signal at subtracter 24. The order of subtraction is not important since the sign of the position error signal may be correlated to the drift of the read element in one direction or the other. Integrator 26 integrates the subtraction signal to produce the position error signal in accordance with a preferred embodiment of the present invention.

Figure 8B:
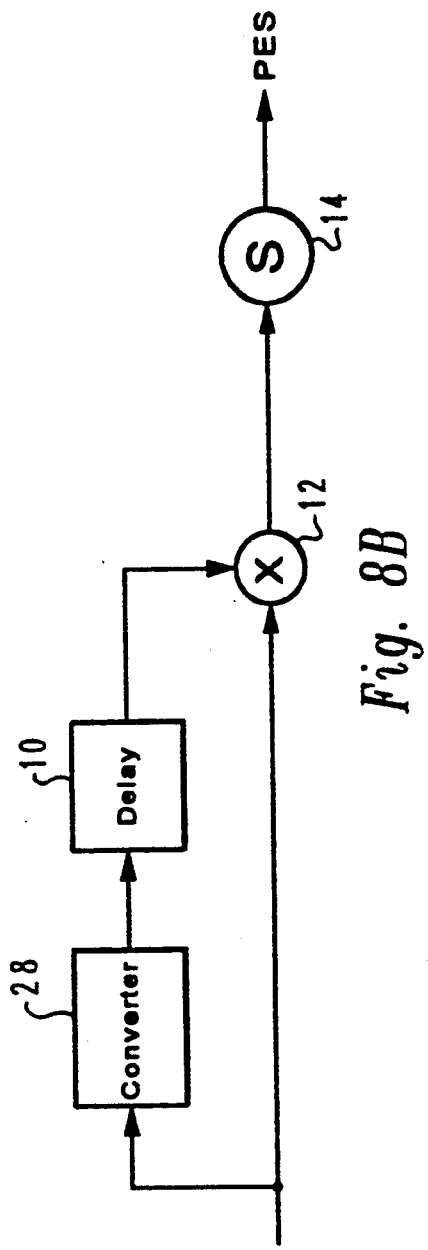
FIG. 8B is a simple block diagram of a position error signal generation circuit using a single delay in accordance with a preferred embodiment of the present invention.

FIG. 8B is a block diagram of a position error signal generator using a single delay in accordance with a preferred embodiment of the present invention. A read signal, originating from a read element, is converted by block 28 into a trinary form, and is delayed at delay block 10. The delayed signal is multiplied by the read signal at multiplier 12 to form a product signal. Afterward, the integrator 14 integrates the product signal to generate a position error signal.

In accordance with a preferred embodiment of the present invention, it is desirable to implement these functions utilizing operational amplifiers. The function for implementation in a dual delay system is:

$$PES = \frac{1}{T} \int \frac{Ra - Rb}{Ra + Rb} dt$$

where position error signal is the resulting position error signal, Ra represents the read signal "multiplied" by a delayed read signal of a first period, and Rb represents the read signal "multiplied" by delayed read signal of a second period.

The normalization function (1/[Ra+Rb]) may be performed with a variable gain stage (VGA) to form an automatic gain control (AGC) circuit. In accordance with a preferred embodiment of the present invention, the subtraction operation (Ra-Rb) may be preformed at a difference amplifier, and the integration may be realized in a low-pass filter.

The present invention assumes that the period of the desired function is within defined bounds and approximately constant. If such is not the case, the output of the autocorrelator may be modulated somewhat linearly for a constant frequency offset, and at a second harmonic rate for periodic and quasi-periodic excursions about the nominal. Corrective action may be required in the form of time base correction, which can be achieved by treating $\tau$ as a controlled parameter.

Figure 9A:
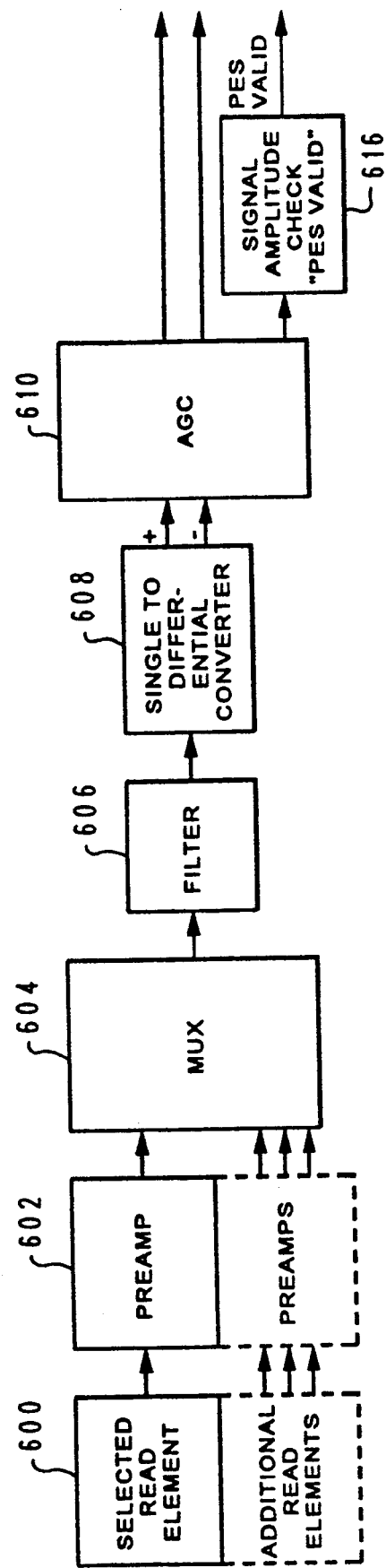
FIG. 9A is a block diagram of the analog signal conditioning portion of a position error signal generation circuit common to both a dual delay and signal delay signal processing method in accordance with a preferred embodiment of the present invention.
Figure 9B:
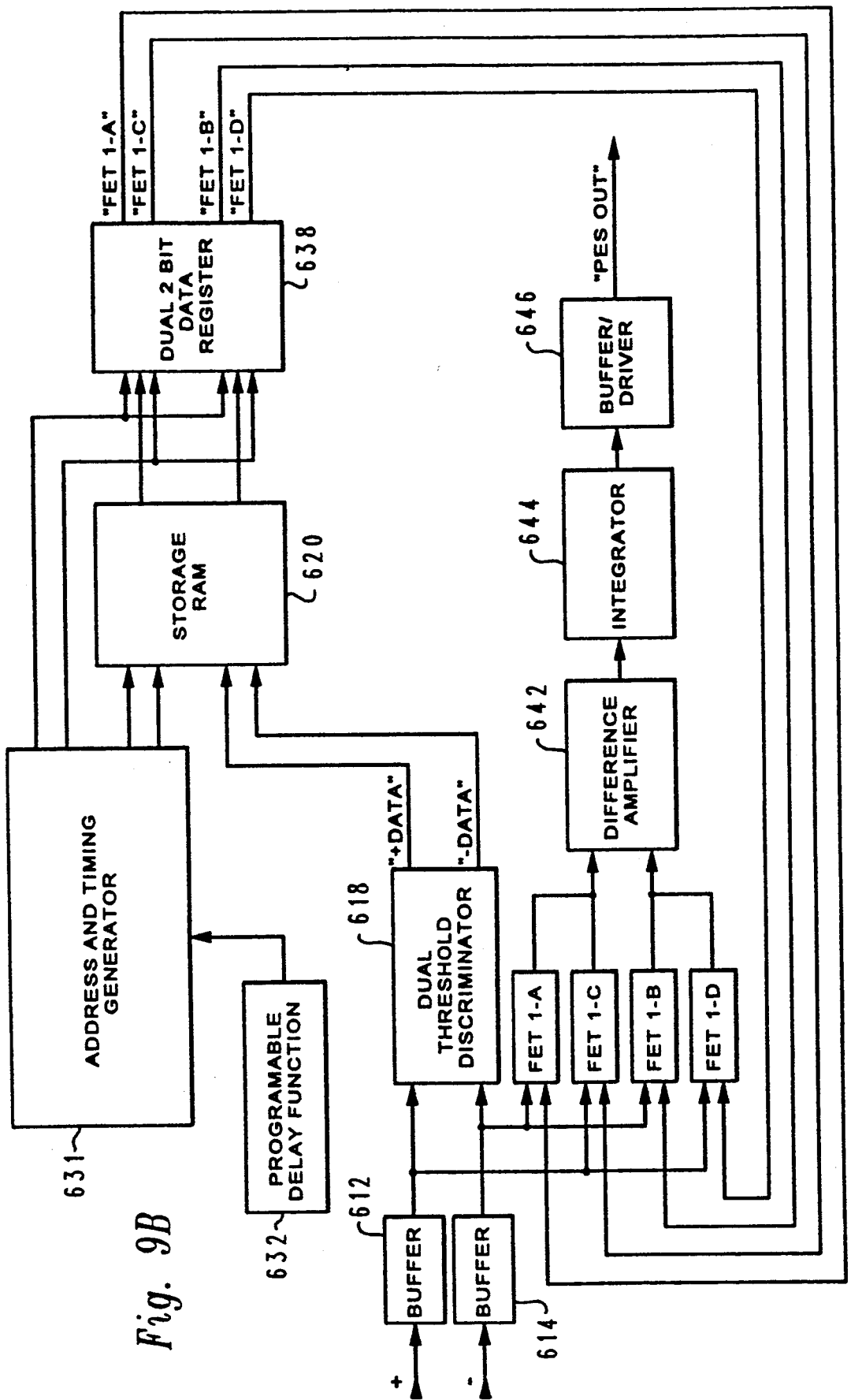
FIG. 9B is a portion of a block diagram of a position error signal generation circuit using a dual delay in accordance with a preferred embodiment of the present invention.
Figure 9C:
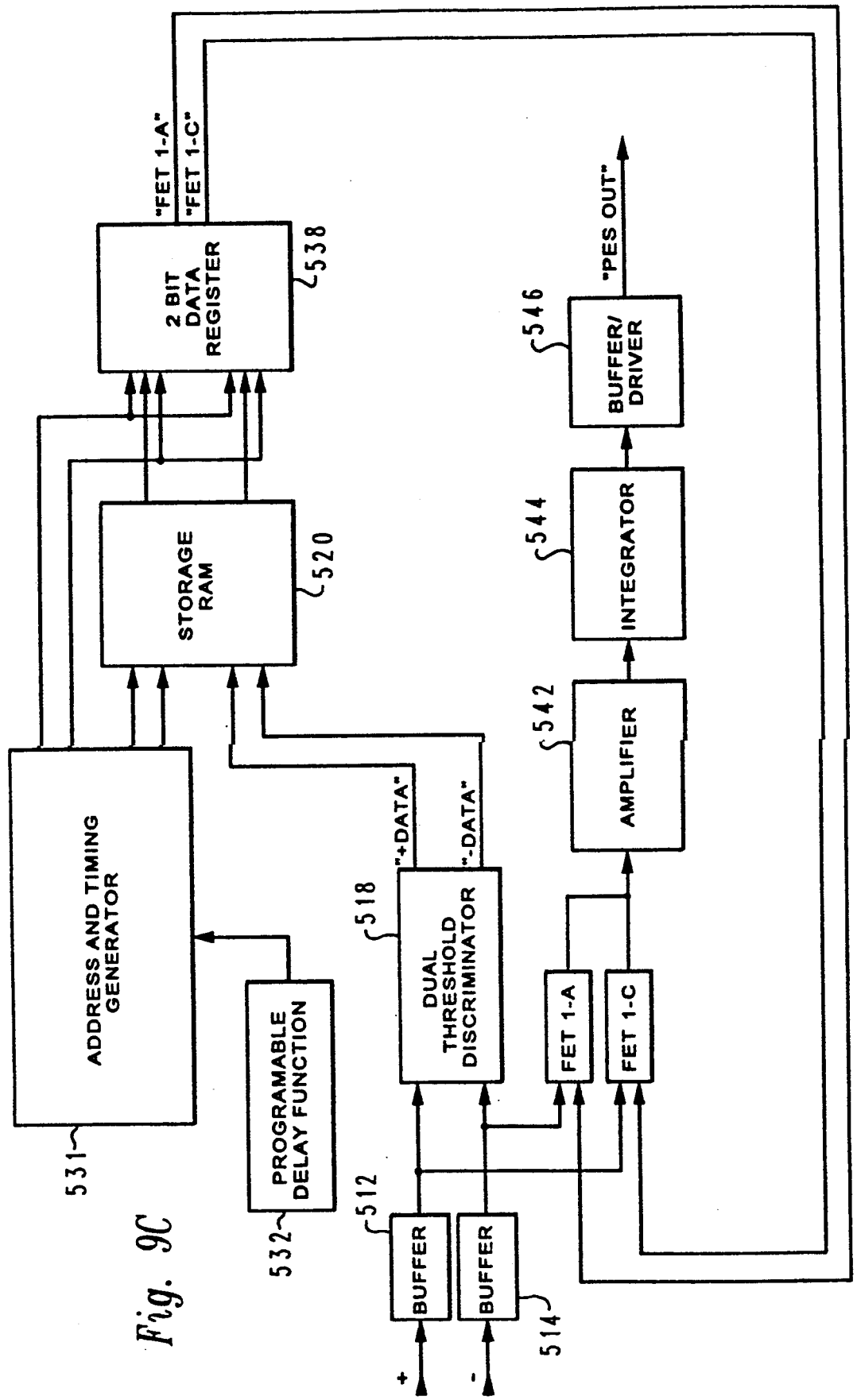
FIG. 9C is a portion of a block diagram of a position error signal generation circuit using a single delay in accordance with a preferred embodiment of the present invention.

FIG. 9A shows a block diagram of the analog signal conditioning portion of a position error signal generation circuit common to both a dual and single delay processing system. FIG. 9B is a portion of a block diagram for a position error signal generation circuit using a dual delay, while FIG. 9C is a portion of a block diagram of a position error signal generation circuit using a single delay in accordance with a preferred embodiment of the present invention. In FIG. 9A, read element 600 detects patterns written on a servo track on a magnetic tape or some other magnetic media. In response to detecting these patterns, read element 600 sends an analog read signal to pre-amp 602, which is utilized to condition the read signal for further processing within the error signal generation circuit. The read signal is then sent to multiplexer 604, which is utilized to select read signals from alternative read elements that may be connected to the position error generation circuit to effect multiple alternative registrations of the read/write head. The selected read signal is sent to filter 606.

Filter 606 includes a multistage filter in accordance with a preferred embodiment of the present invention. Filter 606 is employed to remove extraneous signals or noise from the read signal and may be a high-order bandpass filter. The output from filter 606 is directed into single to differential converter 608, which produces a positive read signal and negative read signal. The positive read signal is 180 degrees out of phase from the negative read signal.

Next, these two read signals are directed to the input of AGC 610. AGC 610 is an automatic gain control circuit utilized to normalize the read signals to give them a constant and consistent amplitude. This module is employed to minimize drops in signals caused by debris and other defects on the tape. Two normalized signals, +read and −read, originate from the output of AGC 610 and are directed buffer 612 and buffer 614 respectively in FIG. 9B.

Additionally in FIG. 9A, an output from AGC 610 is connected to signal amplitude check circuit 616. A valid signal (PES VALID) is the output from signal amplitude check circuit 616 if the magnitude of the signal from AGC 610 is greater than some preselected value or threshold. Otherwise, PES VALID is not output from signal amplitude check circuit 616.

Consequently, the output from this circuit may be utilized to indicate whether the output from AGC 610 is valid or usable by the rest of the position error signal circuitry. For example, if read element 600 is over blank tape the position error signal will indicate that position error has not occurred. In reality, however, a valid read signal is unavailable for the rest of the circuit to utilize. Without signal amplitude check circuit 616, such a situation would not be detected.

In FIG. 9B, the output from buffer 612 and buffer 614 are connected to comparator 618, which converts the true and complement read signals into digital signals comprising +1, 0, or −1 depending on the amplitude of the signal. The digital representation is as follows:

| | | |
|---|---|---|
| 1 0 | signal is greater than upper threshold (+1) | |
| 0 0 | signal is between upper and lower threshold (0) | |
| 0 1 | signal is below lower threshold (−1) | |
| 1 1 | not used or indicates error | |

Comparators may be employed in accordance with a preferred embodiment of the present invention to set the thresholds for this trinary representation of the analog read signals.

A dual-threshold detector may be utilized to generate the two-bit (trinary) representation of read signals. This simple representation takes on values such as +1, 0, or −1 that may be stored, delayed, and retrieved utilizing a shift register or a memory.

Simple address arithmetic may be applied to the shift register positions or memory cell addresses to produce selected digital delay intervals for generating two delayed signals. The trinary signal is sent to the [2-bit wide by X address long] RAM 620. The address space X is greater than or equal to the maximum delay divided by the memory cycle time. Ram 620 is employed to create the delays needed for autocorrelation. A delay is created by storing data in successive addresses in RAM 620 and retrieving the data from that memory after the requisite time.

In accordance with a preferred embodiment of the present invention, the address generator 631 includes an eight bit counter for generating sequential addresses utilized to create a first delay, which is a fixed delay. An eight bit adder utilized to shift the addresses selected in RAM 620 to generate a second set of addresses, creating a second delay. The amount of the second delay is programmable through programmable delay function 632.

The address and timing generator is designed to provide Select, Write Enable, and Strobing signals as might be required by the RAM 620. The values stored in the addresses in RAM 620 are in digital form and are either "10", "00", or "01" corresponding to trinary +1, 0, −1. A dual 2 bit data register 638 is utilized to store data retrieved from RAM 620.

"Multiplication" of the delayed digital signal by the analog read signal is accomplished with a gating function. The trinary values stored in the memories are employed to send the read signal, a null value, or the complement (inverted) read signal as an input to the integrator, corresponding to the (+1, 0, −1) values stored in memory. "Multiplication" in this context is therefore correspondingly defined as [read_signal * +1], [read_signal *0], or [read_signal * −1]. The gating function may be implemented with a field effect transistor (FET) as described below.

The multiplication portion of autocorrelation is performed by the FET's in accordance with a preferred embodiment of the present invention. Dual 2 bit data register 638 has one pair of outputs connected to FET 1-A and FET 1-C and the other pair of outputs connected to FET 1-B and FET 1-D. FET 1-A and FET 1-B also have inputs connected to the output of buffer 614. FET 1-C and FET 1-D have inputs connected to the output of buffer 612. The digital signals from dual 2 bit data register 638 are utilized to gate the true or complement read signals through the FET's. The outputs from FET 1-A and FET 1-B are directed into difference amplifier 642 to produce the correct sign for the signal. Similarly, the outputs from FET 1-C and FET 1-D also are directed into difference amplifier 642 to produce the correct sign for the signal.

Next, the output from difference amplifier 642 is coupled to the input of integrator 644 to integrate the signal. Integrator 644 is a second order low-pass filter in accordance with a preferred embodiment of the present invention. Integrator 644 is utilized to implement the integration function of autocorrelation in accordance with a preferred embodiment of the present invention. In conjunction with the multiplication function, a position error signal is produced by integrating the signal. The output frog integrator 644 is connected to the input of buffer/driver 646, which drives the output position error signal in accordance with a preferred embodiment of the present invention. As a result, a read signal generated by read element 600 is autocorrelated to create a position error signal.

Figure 10:
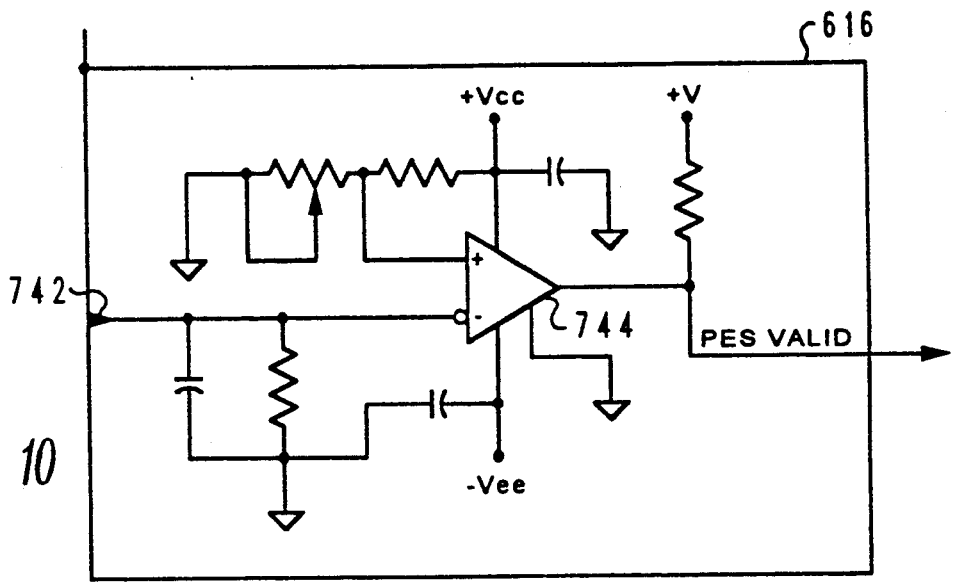
FIG. 10 is a schematic diagram of a signal amplitude check circuit 616 from FIG. 9A.

FIG. 10 depicts a schematic diagram of signal amplitude check circuit 616 in accordance with a preferred embodiment of the present invention. AGC 610 in FIG. 9A has an output connected to the input terminal 742 of comparator 744, which is utilized to determine whether the magnitude of the signal produced by AGC 610 is large enough to be utilized by the rest of the position error generation circuitry.

Figure 11:
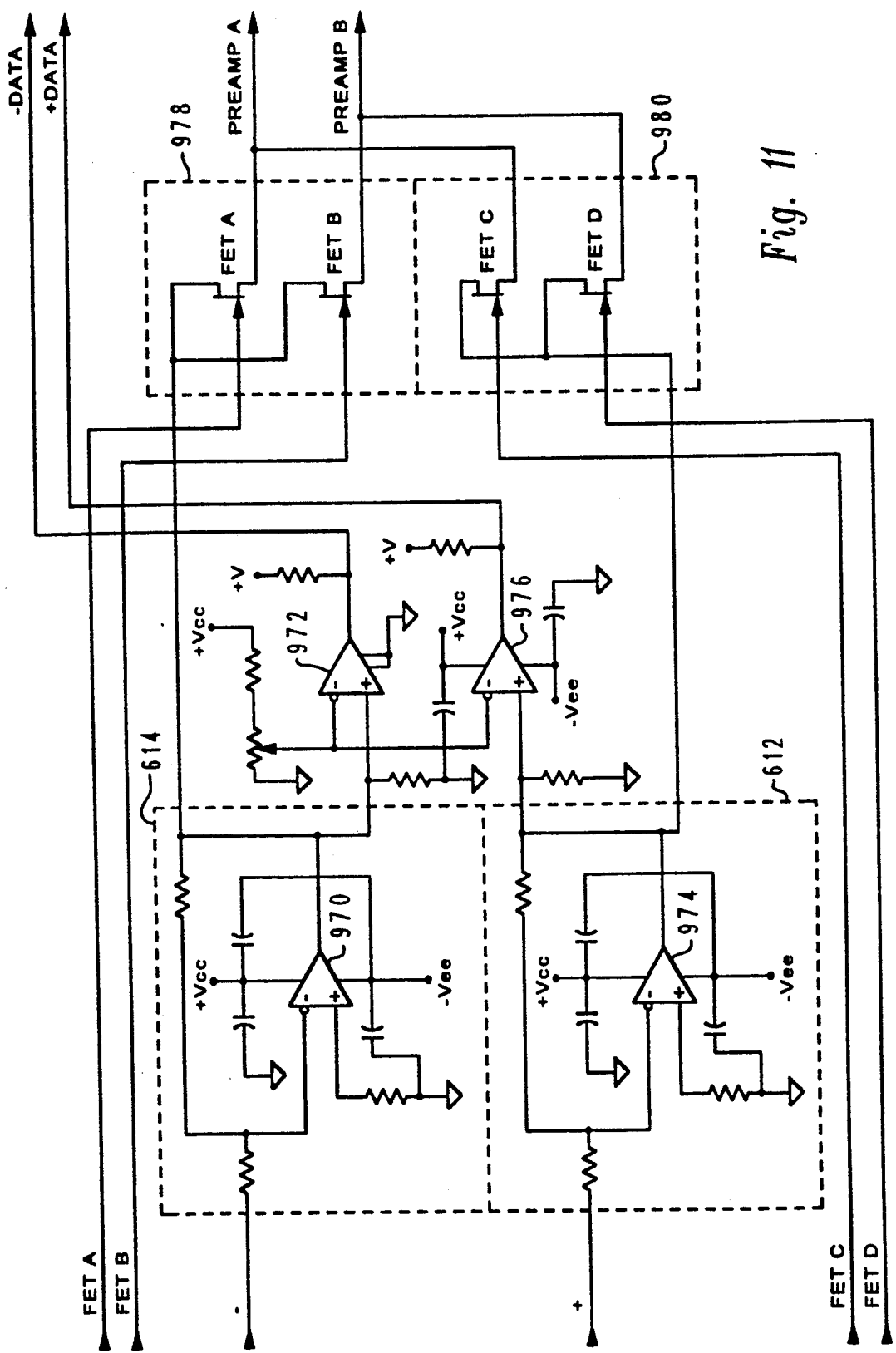
FIG. 11 is a schematic diagram of buffer 612, buffer, 614, FET 1-A, FET 1-B, FET 1-C, and FET 1-D from FIG. 9B.

With reference to FIG. 11, there is depicted a schematic diagram buffer 612, buffer 614, FET 1-A, FET 1-B, FET 1-C, and FET 1-D from FIG. 9B utilized to effect the multiplication function of autocorrelation. Analog read signals are sent into operational amplifiers 970 and 974. These operational amplifiers along with associated capacitors and resisters form buffer 612 and buffer 614. The outputs from the buffers are directed to discriminators 972 and 976 to generate the trinary representation of the read signal, and into FET switch 978 and FET switch 980 in accordance with a preferred embodiment of the present invention. FET switch 978 and FET switch 980 are dual FET's providing the functions performed by FET a-A, FET 1-B, FET 1-C and FET 1-D in FIG. 9B. The output signal from FET 978 and FET 980 is the signal, −read or +read, multiplied by the fixed delayed signal or by programmable delay signal.

In an alternative embodiment of the present invention a single delay autocorrelator is utilized to produce the desired position error signal directly, instead of employing two separate delays.

Figure 12:
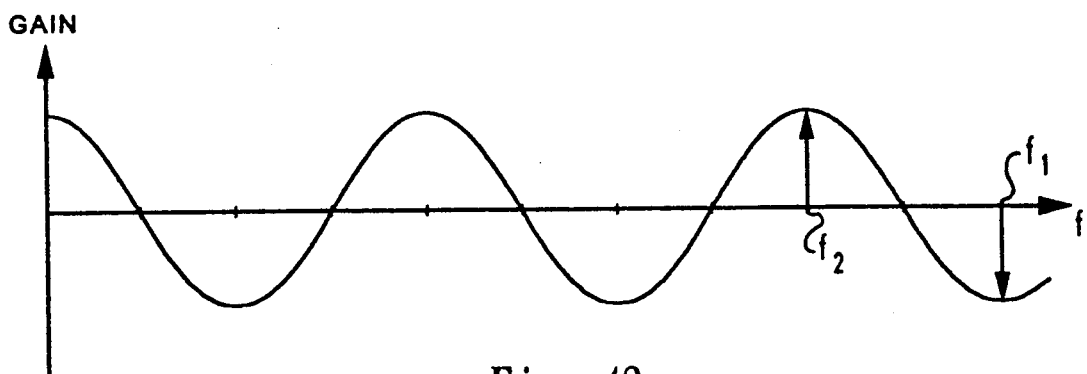
FIG. 12 is a graph of a transfer function of an autocorrelator illustrating single delay embodiment.

It is recognized that an autocorrelator will produce a positive amplitude output signal at frequencies that are integral multiples of the inverse of the time delay of the autocorrelator, and a negative amplitude output signal at frequencies which are integral-plus-half multiples of the inverse of the time delay. By properly selecting the autocorrelator's time delay, both of the signal frequencies, $f_1$ and $f_2$, from the two patterns contained in the servo track can produce an output in the autocorrelator, one with positive amplitude and one with negative amplitude, as shown in FIG. 12. By superposition, the two signals may be combined to yield the desired position error signal.

Selection of Integers n and m

The read signal, generated by a read element, at the input to the AGC has the following form:

$$s_{AGCin} = A_1 \sin(\omega_1 t) + A_2 \sin(\omega_2 t + \theta_2)$$

Where $\theta_2$ is introduced for the purpose of generality and is arbitrary. The AGC is designed to maintain the peaks of the incoming signal to a constant, $C_{AGC}$. As a result, the read signal at the output of the AGC has the same form as the atone equation for $s_{AGCin}$, but with the following restriction:

$$A_1 + A_2 = C_{AGC}$$

The output of the AGC may then be autocorrelated. Delaying the read signal at the input by an amount $T_{delay}$ and then multiplying the delayed read signal by the current read signal gives:

$$s_{MULTout} = [A_1 \sin(\omega_1 t) + A_2 \sin(\omega_2 t + \theta_2)]^*$$
$$[A_1 \sin(\omega_1 t - \omega_1 T_{delay}) + A_2 \sin(\omega_2 t - \omega_2 T_{delay} + \theta_2)]$$

Expanding the above equation yields:

$$s_{MULTout} = A_1^2 [\sin(\omega_1 t)\sin(\omega_1 t - \omega_1 T_{delay})] +$$
$$A_1 A_2 [\sin(\omega_1 t)\sin(\omega_2 t - \omega_2 T_{delay} + \theta_2) +$$
$$\sin(\omega_1 t - \omega_1 T_{delay})\sin(\omega_2 t + \theta_2)] +$$
$$A_2^2 [\sin(\omega_2 t + \theta_2)\sin(\omega_2 t - \omega_2 T_{delay} + \theta_2)]$$

Utilizing the identity, $\sin(x)\sin(y) = 1/2[\cos(x-y) - \cos(x+y)]$, the above equation may written as $$s_{MULTout} = A_1^2 \left[ \frac{\cos(\omega_1 T_{delay})}{2} - \frac{\cos(2\omega_1 t - \omega_1 T_{delay})}{2} \right] +$$

$$A_1 A_2 \left[ \frac{\cos[(\omega_1 - \omega_2)t + \omega_2 T_{delay} - \theta_2]}{2} - \frac{\cos[(\omega_1 + \omega_2)t - \omega_2 T_{delay} + \theta_2]}{2} \right] +$$

$$A_1 A_2 \left[ \frac{\cos[(\omega_1 - \omega_2)t - \omega_1 T_{delay} - \theta_2]}{2} - \frac{\cos[(\omega_1 + \omega_2)t - \omega_1 T_{delay} + \theta_2]}{2} \right] +$$

$$A_2^2 \left[ \frac{\cos(\omega_2 T_{delay})}{2} - \frac{\cos(2\omega_2 t - \omega_2 T_{delay} + \theta_2)}{2} \right]$$

Discarding components at and above the frequency $\omega_1 - \omega_2$, the output of the autocorrelation is the position error signal:

$$PES = A_1^2 \frac{\cos(\omega_1 T_{delay})}{2} + A_2^2 \frac{\cos(\omega_2 T_{delay})}{2}$$

In the preferred embodiment the unwanted high frequency components are removed through use of a low pas filter. A signal of this form becomes useful is $\omega_1$ and $\omega_2$ are chosen so that $\cos(\omega_1 T_{delay}) = -\cos(\omega_1 T_{delay})$. The autocorrelator output is then proportional to the ratio of the difference in amplitudes of the two frequencies in the signal at the AGC input divided by the sum of the amplitudes:

$$PES = \frac{\cos(\omega_1 T_{delay})}{2} [A_1^2 - A_2^2]$$
$$= \frac{\cos(\omega_1 T_{delay})}{2} C_{AGC}[A_1 - A_2]$$

As shown above, an autocorrelator operating with a signal delay can yield an output that is proportional to the difference in the amplitude of the two frequencies and also proportional to $\cos(\omega_1 T_{delay})$. As the tape velocity changes, the frequency $\omega_1$ also changes. Consequently, it is advantageous to choose a nominal value for $\omega_1$ such that:

$$\frac{d\cos(\omega_1 T_{delay})}{d\omega_1} = 0, \cos(\omega_1 T_{delay}) = -\cos(\omega_2 T_{delay})$$

To meet the above criterion, one of the following must be true:

$$\omega_1 T_{delay} = 2n\pi, \quad \omega_2 T_{delay} = (2m+1)\pi$$

or $$\omega_1 T_{delay} = (2m+1)\pi, \quad \omega_2 T_{delay} = 2n\pi$$

where m and n are positive integers. Letting $\omega_i 2\pi f_i$, the above becomes:

$$f_1 T_{delay} = n, \quad f_2 T_{delay} = m + \frac{1}{2}$$

or $$f_1 T_{delay} = m + \frac{1}{2}, \quad f_2 T_{delay} = n$$

Now letting $T_i = f_i^{-1}$, the following are obtained for the selection of $f_1$, $f_2$ and $T_{delay}$:

$$\frac{f_1}{f_2} = \frac{n}{m + \frac{1}{2}}, \quad T_{delay} = nT_1 = \left[m + \frac{1}{2}\right]T_2$$

or $$\frac{f_1}{f_2} = \frac{m + \frac{1}{2}}{n}, \quad T_{delay} = \left[m + \frac{1}{2}\right]T_1 = nT_2$$

where m and n are selected positive integers, $f_1$ is the frequency of the first pattern on the magnetic media, $f_2$ is the frequency of the second pattern on the magnetic media, $T_1 = 1/f_1$, $T_2 = 1/f_2$, and $T_{delay}$ is the delay. The two patterns are required to be not related harmonically to each other.

Single delay implementation with trinary representation of read signal: Analog conditioning of the read signal for the single delay implementation is identical to that described for the dual delay; (refer to FIG. 9A).

In FIG. 9C, the output from buffer 512 and buffer 514 are connected to comparator 518 which converts the true and complement read signals into digital signals comprised of +1, 0, or −1 depending on the amplitude of the signal. Comparators may be employed in accordance with a preferred embodiment of the present invention to set the thresholds for a trinary representation of data as described in the dual delay system. The digital read signal is sent to RAM 520.

RAM 520 is employed to create the delays needed for autocorrelation in accordance with a preferred embodiment of the present invention. The delay is created by storing data in sequential addresses in RAM 520 and retrieving the data for use after a certain delay.

In FIG. 9C, the output from buffer 512 and buffer 514 are connected to comparator 518, which converts the true and complement read signals into digital signals comprising +1, 0, or −1 depending on the amplitude of the signal. The digital representation is as follows:

1 0 signal is greater than upper threshold (+1)
0 0 signal is between upper and lower threshold (0)
0 1 signal is below lower threshold (−1)
1 1 not used or indicates error Comparators may be employed in accordance with a preferred embodiment of the present invention to set the thresholds for this trinary representation of the analog read signals.

A dual-threshold detector may be utilized to generate the two-bit (trinary) representation of read signals. This simple representation takes on values such as +1, 0, or −1 that may be stored, delayed, and retrieved utilizing a shift register or a memory.

Simple address arithmetic may be applied to the shift register positions or memory cell addresses to produce the digital delay interval for retrieving the delayed signals. The trinary signal is sent to the [2-bit by X address long] RAM 520. The address space X is greater than or equal to the maximum delay divided by the memory cycle time. Ram 520 is employed to create the delay needed for autocorrelation. A delay is created by storing data in successive addresses in RAM 520 and retrieving the data from that memory after the requisite time.

In accordance with a preferred embodiment of the present invention, the address generator is an eight bit counter for generating sequential addresses utilized to create a delay, which is a fixed delay.

Address and timing generator 531 is designed to provide Select, Write Enable, and Strobing signals as might be required by the RAM 520 The values stored in the addresses in RAM 520 are in digital form and are either "10", "00", or "01" corresponding to trinary +1, −0, −1. A 2 bit data register 538 is utilized to store data retrieved from RAM 520.

"Multiplication" of the delayed digital signal by the analog read signal is accomplished with a gating function. The trinary values stored in the memory are employed to send the read signal, a null value, or the complement (inverted) read signal as an input to the integrator, corresponding to the (+1, 0, −1) values stored in memory. "Multiplication" in this context is therefore correspondingly defined as [read_signal * +1], [read_signal *0], or [read_signal *−1]. The gating function may be implemented with a field effect transistor (FET) as described below.

The multiplication portion of autocorrelation is performed by the FET's in accordance with a preferred embodiment of the present invention. 2 bit data register 538 is connected to FET 1-A and FET 1-C. FET 1-A and FET 1-C also have inputs connected to the output of buffer 514 and 512. The digital signals from 2 bit data register 538 are utilized to gate the true or complement read signals through the FET's. The outputs from FET 1-A and FET 1-C are directed into difference amplifier 542 to produce the correct sign for the signal.

Next, the output from difference amplifier 542 is directed into integrator 544 to integrate the signal. Integrator 544 is a second order low-pass filter in accordance with a preferred embodiment of the present invention. Integrator 544 is utilized to employ the integration function of autocorrelation.

The output from integrator 544 is connected to the input of buffer/driver 546, which drives the output position error signal in accordance with a preferred embodiment of the present invention. As a result the autocorrelation function may be performed upon the signal detected by read element 500.

Figure 13:
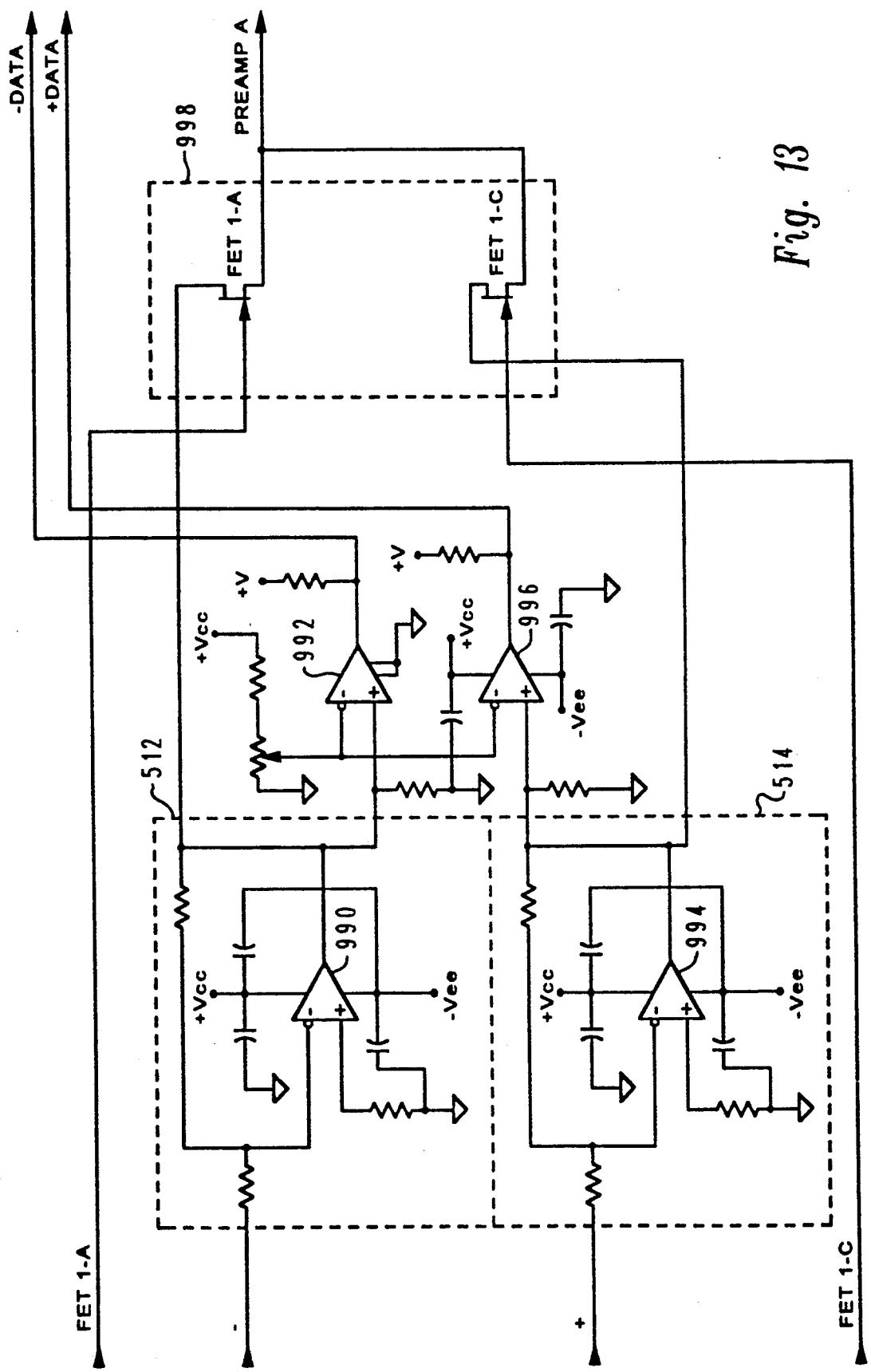
FIG. 13 is a schematic diagram of buffer 512, buffer 514, FET 1-A, and FET 1-C utilized for providing the multiplication function for autocorrelation from FIG. 9C.

Referring now to FIG. 13, there is depicted a schematic diagram of buffer 512, buffer 514, FET 1-A and FET 1-C from FIG. 9C utilized for providing the multiplication function for autocorrelation. Analog read signals are sent into operational amplifiers 990 and 994. These operational amplifiers along with associated capacitors and resistors form buffers 512 and 514. The outputs from the buffers are directed to discriminators 992 and 996 to generate a trinary representation of the read signal, and into FET switch 998 in accordance with a preferred embodiment of the present invention. The output from FET switch 998 is a product of the current input signal and the delayed signal.

One advantage of the single delay embodiment involves velocity tolerance. The frequencies of the servo track signals vary with tape velocity. The autocorrelator transfer function has maximum frequency sensitivity at transfer functions nulls. When a null is utilized to suppress a signal, it is important that the frequency of the signal be well controlled or that the autocorrelator function be dynamically adjusted to track frequency variations. With a single delay system, signal frequencies may be positioned away from nulls, and at transfer function maxima where frequency sensitivity is zero. This is illustrated in FIG. 12, where the signal frequencies, $f_1$ and $f_2$ are positioned as shown. The autocorrelator transfer function gain is nearly constant in the neighborhoods of these frequencies.

An additional advantage of the depicted invention is that a single delay system eliminates one set of multiplier and filters as well as simplifying the subtraction circuit as compared to a dual delay system. The delay generator is also simpler in a single delay system. These advantages are realized at the cost of constraining selection of $f_1$ and $f_2$.

The autocorrelation function may be implemented in various ways other than the depicted embodiments. For example, instead of employing a single difference amplifier as shown in FIG. 9B, each set of FET's may have an integration circuit, such as integrator 644, with the outputs from the integration circuit being connected to a difference amplifier to subtract the two signals from each other to produce a position error signal.

As a result, a position error signal may be generated for use in maintaining a tape head in a selected position. When the read element in tape head is at the center of the servo track, equal portions of both patterns are detected and translated into a read signal. The autocorrelation function implemented in accordance with a preferred embodiment of the present invention will provide a position error signal of zero when there is no position error. If the read element drifts away from the center of the servo track, to one side or the other, the proportion of the patterns translated into a read signal will not be equal.

Autocorrelation in accordance with a preferred embodiment of the present invention of the signal will result in a voltage that may be positive or negative. The magnitude of the voltage will change depending on how far the read element drifts from the center of the servo track.. The sign of the voltage will depend on which direction the read element drifts away from the center of the servo track. This voltage is proportional to the amount of drift in the read element in relation to the center of the servo track.

While the invention has been particularly shown and described with reference to a preferred embodiment, it will be understood by those skilled in the art that various changes in form and detail may be made therein without departing from the spirit and scope of the invention.

What is claimed is:

1. An apparatus for generating a position error signal from a read signal generated by a read element passing over a track comprising two patterns positioned parallel to each other on a magnetic media, the system comprising:
   first and second repetitive harmonically unrelated patterns disposed parallel to each other on the track;
   digitizing means coupled to the read element for producing a trinary representation of the read signal;
   delay means coupled to the read element for producing a delayed signal from the read signal;
   multiplication means coupled to the delay means for multiplying the read signal with the delayed signal to form a product signal; and
   integration means coupled to the multiplication means for integrating the product signal to produce a position error signal, wherein changes in the position error signal are proportional to changes in position of the read element over the first and second repetitive harmonically unrelated patterns positioned parallel to each other on the magnetic media.

2. The apparatus of claim 1, wherein the integration means comprises a low-pass filter.

3. The apparatus of claim 2, wherein the integration means further includes means to normalize the product signal.

4. The apparatus of claim 1, wherein the first pattern has a first frequency and the second pattern has a second frequency, and wherein the delay for the delay means is selectable.

5. The apparatus of claim 4, wherein the selectable delay is selected as follows:

$$\frac{f_1}{f_2} = \frac{n}{m + \frac{1}{2}}, T_{delay} = nT_1 = \left[m + \frac{1}{2}\right]T_2$$

or $$\frac{f_1}{f_2} = \frac{m + \frac{1}{2}}{n}, T_{delay} = \left[m + \frac{1}{2}\right]T_1 = nT_2$$

where m and n are selected positive integers, $f_1$ is the first frequency, $f_2$ is the second frequency, $T_1 = 1/f_1$, $T_2 = 1/f_2$, and $T_{delay}$ is the delay, wherein m and n are chosen as follows:

$$f_1 T_{delay} = n, f_2 T_{delay} = m + \frac{1}{2}$$

or $$f_1 T_{delay} = m + \frac{1}{2}, f_2 T_{delay} = n.$$

6. The apparatus of claim 4, wherein the delay means includes a memory, wherein the read signal is stored in the memory for a period of time set by the selectable delay.

7. The apparatus of claim 6, wherein the memory is structured as a shift register.

8. The apparatus of claim 6, wherein the memory is structured as a random access storage device.

9. The apparatus of claim 1, wherein the magnetic media is a magnetic tape utilized in a tape storage system.

10. An apparatus for generating a position error signal relative to a track from a read signal produced by a read element passing over a magnetic media in response to the read element detecting a track comprising two patterns positioned parallel to each other on a magnetic media, the system comprising:
    first and second repetitive harmonically unrelated patterns disposed parallel to each other on the track;
    delay means coupled to the read element for producing a first delayed signal and a second delayed signal from the read signal generated by the read element;
    multiplication means coupled to the delay means for multiplying the read signal with the first delayed signal to form a first product signal and for multiplying the read signal with the second delayed signal to form second product signal;
    subtraction means coupled to the multiplication means for subtracting the first product signal from the second product signal to produce a differential signal; and integration means coupled to the subtraction means for integrating the differential signal to produce a position error signal, wherein changes in the position error signal are proportional to changes in position of the read element over the first and second repetitive harmonically unrelated patterns positioned parallel to each other on the magnetic media.

11. The apparatus of claim 10, wherein the integration means comprises a low-pass filter.

12. The apparatus of claim 10 further comprising an automatic gain control circuit having an input coupled to the read element, wherein output of the automatic gain control circuit is coupled to the delay means to provide the delay means a normalized read signal.

13. The apparatus of claim 12 further comprising a comparator coupled to an output of the automatic gain control signal to determine whether the signal generated by the read element is above a selected level, wherein a signal above the selected level results in a valid signal being generated to indicate that the signal is usable for generating a position error signal.

14. The apparatus of claim 10, wherein the subtraction means comprises a difference amplifier circuit.

15. The apparatus of claim 10, wherein the delay means comprises a memory, wherein the first delayed signal is created by storing the read signal in the memory for a first period of time before retrieving the read signal from the memory and the second delayed signal is created by storing the read signal in the memory for a second period of time before retrieving the read signal from the memory.

16. The apparatus of claim 15, wherein the delay means further comprises an address generation means coupled to the memory for creating a first and second number of addresses utilized in storing, delaying, and retrieving the digitized read signal from the memory, the first delayed signal being generated when the digitized read signal is retrieved from the first number of addresses in the memory after a first delay and the second delayed signal being generated when the read digitized signal is retrieved from the second number of addresses in the memory after a second delay.

17. The apparatus of claim 16, wherein the address generation means comprises a counter and an adder coupled to the memory.

18. An apparatus for generating a position error signal from a read signal generated by a read element passing over a track, the apparatus comprising:
a first pattern having a first frequency parallel to a second pattern having a second frequency on a magnetic media, wherein the first and second patterns are located on the track are repetitive and harmonically unrelated;
delay means for producing a delayed signal from the read signal;
multiplication means for multiplying the read signal with the delayed signal to form a product signal; and
integration means for integrating the product signal to produce a position error signal, wherein changes in the position error signal are proportional to changes in position of the read element over the first pattern and the second pattern.

19. The apparatus of claim 18, wherein the delay is selectable.

20. The apparatus of claim 19, wherein the selectable delay is selected as follows:

$$\frac{f_1}{f_2} = \frac{n}{m + \frac{1}{2}}, T_{delay} = nT_1 = \left[m + \frac{1}{2}\right]T_2$$

or $$\frac{f_1}{f_2} = \frac{m + \frac{1}{2}}{n}, T_{delay} = \left[m + \frac{1}{2}\right]T_1 = nT_2$$

where m and n are selected positive integers, $f_1$ is the first frequency, $f_2$ is the second frequency, $T_1 = 1/f_1$, $T_2 = 1/f_2$, and $T_{delay}$ is the delay, wherein m and n are chosen as follows:

$$f_1 T_{delay} = n, f_2 T_{delay} = m + \frac{1}{2}$$

or $$f_1 T_{delay} = m + \frac{1}{2}, f_2 T_{delay} = n.$$

21. The apparatus of claim 18, wherein the delay means comprises storing the read signal in a memory for a selected period of time equal to the delay before retrieving the signal to generate the delayed signal.

22. The apparatus of claim 18, wherein the integration means comprises a low-pass filter.

23. The apparatus of claim 22, wherein the low-pass filter is a second order low-pass filter.

24. The apparatus of claim 18 further comprising an automatic gain control circuit coupled to the read element, wherein output of the automatic gain control circuit is coupled to the delay means to provide the delay means with a normalized read signal.

25. The apparatus of claim 23 further comprising a comparator coupled to the output of the automatic gain control circuit to determine whether the normalized read signal generated by the automatic gain control circuit is above a selected level, wherein a normalized read signal above the selected level results in a valid signal being generated to indicate that the signal is usable for generating a position error signal.

26. A method for generating a position error signal from a read signal generated by a read element passing over a track having two patterns disposed parallel to each other on a magnetic media, the method comprising:
generating a delayed signal from the read signal produced by the read element passing over two repetitive harmonically unrelated patterns positioned parallel to each other on the track;
multiplying the read signal with the delayed signal to form a product signal; and
integrating the product signal to produce a position error signal, wherein changes in the position error signal is proportional to changes in position of the read element over the two repetitive harmonically unrelated patterns positioned parallel to each other on the magnetic media.

27. A method for generating a position error signal from a read signal generated by a read element passing over a track having two patterns disposed parallel to each other on a magnetic media, the method comprising:

generating a first and second delayed signal from the read signal produced by the read element passing over the two repetitive harmonically unrelated patterns positioned parallel to each other on the track;

multiplying the read signal with the first delayed signal to form a first product signal;

multiplying the read signal with the second delayed signal to form a second product signal;

subtracting the first product signal from the second product signal to produce a subtracted signal; and integrating the subtracted signal to produce a position error signal, wherein changes in the position error signal are proportional to changes in the position of the unrelated patterns positioned parallel to each other on the magnetic media.

28. A data storage system comprising:

a read element for producing a read signal upon detection of a servo track, wherein the servo track includes two repetitive patterns positioned parallel to each other on the servo track, the two patterns being harmonically unrelated to each other;

delay means responsive to the read signal for producing a delayed read signal;

multiplication means for multiplying the delayed read signal with the read signal to form a product signal; and integration means for integrating the product signal to produce a position error signal proportional to changes in contribution to the read signal by first and second repetitive and harmonically unrelated patterns in the read signal, produced by the read element.

29. The data storage system of claim 28, further comprising an actuator responsive to the position error signal for adjusting a relative position of the read element and the servo track.

30. The data storage system of claim 29, wherein said actuator means adjusts the read element relative to the servo track.

31. The data storage system of claim 30, wherein the servo track is located on a magnetic media.

32. An apparatus for generating a position error signal from a read signal generated by a read element passing over a track comprising two patterns positioned parallel to each other on a magnetic media, the system comprising:

first and second repetitive harmonically unrelated patterns disposed parallel to each other on the track;

digitizing means coupled to the read element for producing a trinary representation of the read signal;

delay means coupled to the digitizing means for producing a delayed signal from the read signal;

multiplication means coupled to the delay means for multiplying the read signal with the delayed signal to form a product signal; and integration means coupled to the multiplication means for integrating the product signal to produce a position error signal, wherein changes in the position error signal are proportional to changes in position of the read element over the first and second repetitive harmonically unrelated patterns positioned parallel to each other on the magnetic media.

33. The apparatus of claim 32, wherein the read signal includes a true component and a complement component and wherein the multiplication means includes digital switching of the true component and the complement component.

34. The apparatus of claim 33, wherein the multiplication means includes degating the read signal when the delayed signal is represented by digital encoding defined as zero.

35. The apparatus of claim 34, wherein multiplication is defined for the weightings +1, 0, and −1.

36. The apparatus of claim 1, wherein the first and second harmonically unrelated patterns position parallel to each other on a magnetic media are related to each other by:

$$\frac{f_1}{f_2} = \frac{n}{m + \frac{1}{2}}$$

or $$\frac{f_1}{f_2} = \frac{m + \frac{1}{2}}{n}$$

where $f_1$ is the frequency of the first pattern, $f_2$ is the frequency of the second pattern, n is a positive integer, and m is a positive integer, wherein m and n are chosen as follows:

$$f_1 T_{delay} = n, f_2 T_{delay} = m + \frac{1}{2}$$

or $$f_1 T_{delay} = m + \frac{1}{2}, f_2 T_{delay} = n,$$

where $R_{delay}$ is a delay.

37. The apparatus of claim 18, wherein the first and second harmonically unrelated patterns position parallel to each other on a magnetic media are related to each other by:

$$\frac{f_1}{f_2} = \frac{n}{m + \frac{1}{2}}$$

or $$\frac{f_1}{f_2} = \frac{m + \frac{1}{2}}{n}$$

where $f_1$ is the frequency of the first pattern, $f_2$ is the frequency of ht second pattern, n is a positive integer, and m is a positive integer, wherein m and n are chosen as follows:

$$f_1 T_{delay} = n, f_2 T_{delay} = m + \frac{1}{2}$$

or $$f_1 T_{delay} = m + \frac{1}{2}, f_2 T_{delay} = n$$

where $T_{delay}$ is a delay.

* * * * *